US010602015B2

(12) United States Patent
Wang et al.

(10) Patent No.: US 10,602,015 B2
(45) Date of Patent: Mar. 24, 2020

(54) PICTURE DISPLAYING METHOD AND APPARATUS, AND TERMINAL DEVICE

(71) Applicant: Huawei Device Co., Ltd., Dongguan (CN)

(72) Inventors: Xiuwen Wang, Shenzhen (CN); Haitao Zhang, Shanghai (CN)

(73) Assignee: HUAWEI DEVICE CO., LTD., Dongguan (CN)

( * ) Notice: Subject to any disclaimer, the term of this patent is extended or adjusted under 35 U.S.C. 154(b) by 0 days.

(21) Appl. No.: 15/047,909

(22) Filed: Feb. 19, 2016

(65) Prior Publication Data

US 2016/0173720 A1    Jun. 16, 2016

Related U.S. Application Data

(63) Continuation of application No. PCT/CN2013/087553, filed on Nov. 21, 2013.

(51) Int. Cl.
*H04N 1/21* (2006.01)
*G06F 16/68* (2019.01)
(Continued)

(52) U.S. Cl.
CPC ........... *H04N 1/2112* (2013.01); *G06F 3/165* (2013.01); *G06F 16/686* (2019.01);
(Continued)

(58) Field of Classification Search
CPC .... H04N 1/00; H04N 1/2112; H04N 1/00413; H04N 1/00416; H04N 1/00427;
(Continued)

(56) References Cited

U.S. PATENT DOCUMENTS 6,334,025 B1 * 12/2001 Yamagami ........... G11B 27/105
386/241
6,774,939 B1   8/2004 Peng
(Continued)

FOREIGN PATENT DOCUMENTS

CN    101471987 A    7/2009
CN    101690154 A    3/2010
(Continued)

OTHER PUBLICATIONS

"Exchangeable Image File Format for Digital Still Cameras: Exif Version 2.2," Standard of Japan Electronics and Information Technology Industries Association (JEITA) CP-3451, Est. Apr. 2002, 154 pages.

*Primary Examiner* — Pritham D Prabhakher
(74) *Attorney, Agent, or Firm* — Slater Matsil, LLP

(57) ABSTRACT

A picture displaying method and apparatus, and a terminal device are disclosed. The method includes detecting a view instruction, input by a user, on any picture; responding to the view instruction and outputting the picture; acquiring generation time of the picture from EXIF information of the picture; and querying whether an audio file with a file name including the generation time of the picture is stored, and if the audio file is stored, outputting the audio file. By implementing embodiments of the present invention, the user can not only obtain a static image directly from the picture, but also obtain audio information around a shooting scene in addition to the static image, thereby keeping more memories for the user and improving user experience.

20 Claims, 10 Drawing Sheets

(51) Int. Cl.
*H04N 1/32* (2006.01)
*G06F 3/16* (2006.01)
*H04N 5/232* (2006.01)
*H04N 5/77* (2006.01)
*H04M 1/725* (2006.01)

(52) U.S. Cl.
CPC ...... *H04N 1/32128* (2013.01); *H04N 5/23216* (2013.01); *H04N 5/23293* (2013.01); *H04N 5/772* (2013.01); *H04M 1/72522* (2013.01); *H04M 1/72558* (2013.01); *H04N 2201/3264* (2013.01); *H04N 2201/3273* (2013.01)

(58) Field of Classification Search
CPC .............. H04N 1/0044; H04N 1/00458; H04N 1/00477; H04N 1/00474; H04N 1/2133; H04N 1/215; H04N 5/23216; H04N 5/23293; H04N 5/772; H04N 5/23238; H04N 2201/3264; H04N 2201/3247; H04N 2101/00; H04N 2201/218; H04M 1/72522; H04M 1/72558; G06F 3/165; G06F 17/30752
USPC ....................................... 348/231.4
See application file for complete search history.

(56) References Cited

U.S. PATENT DOCUMENTS

| | | | |
|---|---|---|---|
| 7,265,782 B2 | 9/2007 | Iijima | |
| 8,059,921 B2* | 11/2011 | Frohlich | G11B 31/006 382/321 |
| 9,083,875 B2* | 7/2015 | Salisbury | H04N 5/232 |
| 2003/0189653 A1* | 10/2003 | Iijima | H04N 1/2112 348/231.99 |
| 2003/0190142 A1* | 10/2003 | Togashi | G06F 1/1626 386/235 |
| 2004/0037540 A1* | 2/2004 | Frohlich | G11B 31/006 386/285 |
| 2004/0179122 A1 | 9/2004 | Morimoto et al. | |
| 2007/0064123 A1* | 3/2007 | Aizawa | G11B 27/034 348/231.99 |
| 2008/0049349 A1* | 2/2008 | Nakase | H04N 1/00204 360/48 |
| 2009/0290854 A1 | 11/2009 | Smith et al. | |
| 2010/0239223 A1 | 9/2010 | Oisel et al. | |
| 2011/0037777 A1* | 2/2011 | Lindahl | G06F 1/1626 345/619 |
| 2012/0242843 A1* | 9/2012 | Kakiuchi | H04N 5/772 348/207.1 |
| 2012/0249853 A1* | 10/2012 | Krolczyk | H04N 1/00448 348/333.01 |
| 2013/0031502 A1* | 1/2013 | Salisbury | H04N 5/232 715/771 |
| 2013/0107073 A1* | 5/2013 | Mishra | H04N 5/23232 348/222.1 |
| 2013/0293746 A1* | 11/2013 | Iki | H04N 5/23293 348/239 |
| 2014/0006948 A1* | 1/2014 | Yang | G11B 19/025 715/716 |
| 2014/0078331 A1* | 3/2014 | McMahon | H04N 9/8063 348/211.99 |
| 2014/0148220 A1* | 5/2014 | Park | H04M 1/0202 455/556.1 |

FOREIGN PATENT DOCUMENTS

| | | |
|---|---|---|
| CN | 101753941 A | 6/2010 |
| CN | 102609968 A | 7/2012 |
| CN | 103327277 A | 9/2013 |
| JP | H0690429 A | 3/1994 |
| JP | H11136608 A | 5/1999 |
| JP | 2000078516 A | 3/2000 |
| JP | 2003101914 A | 4/2003 |
| JP | 2003230090 A | 8/2003 |
| JP | 2004274500 A | 9/2004 |
| JP | 2005354506 A | 12/2005 |
| JP | 2006024307 A | 1/2006 |
| JP | 2006229293 A | 8/2006 |
| KR | 20030079771 A | 10/2003 |

\* cited by examiner

PICTURE DISPLAYING METHOD AND APPARATUS, AND TERMINAL DEVICE

This application is a continuation of International Application No. PCT/CN2013/087553, filed on Nov. 21, 2013, which is hereby incorporated by reference in its entirety.

TECHNICAL FIELD

The present invention relates to the field of communications technologies, and in particular, to a picture displaying method and apparatus, and a terminal device.

BACKGROUND

As is known to all, a photographing function and a recording function have become two indispensable standard configurations of a smartphone (for example, an Android phone and an iOS phone). By using a photographing function of a smartphone, a user can not only avoid much inconvenience of carrying a camera, but also shoot a desired picture easily at will, thereby meeting the user's photographing requirement.

However, it is found from practice that although a picture can be easily shot by using a photographing function of a smartphone, such a picture can only display a static image, and except the static image, the user cannot obtain audio information around a shooting scene, thereby failing to keep more memories for the user.

SUMMARY

Embodiments of the present invention disclose a picture displaying method and apparatus, and a terminal device, which are used to solve the foregoing problem that a picture can only display a static image, and a user cannot acquire audio information around a shooting scene in addition to the static image.

A first aspect of the embodiments of the present invention provides a picture displaying method, where the method includes: detecting a view instruction, input by a user, on any picture; responding to the view instruction and outputting the picture; acquiring generation time of the picture from exchangeable image file (EXIF) information of the picture; and querying whether an audio file with a file name including the generation time of the picture is stored, and if the audio file is stored, outputting the audio file.

In a first possible implementation manner of the first aspect of the embodiments of the present invention, after the querying that the audio file with a file name including the generation time of the picture is stored and before the outputting the audio file, the method further includes: displaying an audio playback button on the output picture; detecting an operation instruction, input by the user, on the audio playback button; and responding to the operation instruction and performing the step of outputting the audio file.

With reference to the first aspect of the embodiments of the present invention or the first possible implementation manner of the first aspect of the embodiments of the present invention, in a second possible implementation manner of the first aspect of the embodiments of the present invention, before the detecting a view instruction, input by a user, on any picture, the method further includes: detecting a recording operation startup instruction input by the user; responding to the recording operation startup instruction and starting a recording operation; detecting a photographing operation instruction input by the user; responding to the photographing operation instruction and performing a photographing operation, so as to generate a picture; detecting a recording operation end instruction input by the user; responding to the recording operation end instruction and ending the recording operation, so as to generate an audio file; storing the generated picture; and storing the audio file by using a file name that includes generation time of the picture.

With reference to the first aspect of the embodiments of the present invention or the first possible implementation manner of the first aspect of the embodiments of the present invention, in a third possible implementation manner of the first aspect of the embodiments of the present invention, before the detecting a view instruction, input by a user, on any picture, the method further includes: detecting a photographing operation instruction input by the user; responding to the photographing operation instruction and performing a photographing operation, so as to generate a picture; storing the generated picture; detecting a recording operation startup instruction input by the user; responding to the recording operation startup instruction and starting a recording operation; detecting a recording operation end instruction input by the user; responding to the recording operation end instruction and ending the recording operation, so as to generate an audio file; and storing the audio file by using a file name that includes generation time of the picture.

With reference to the first aspect of the embodiments of the present invention or the first possible implementation manner of the first aspect of the embodiments of the present invention, in a fourth possible implementation manner of the first aspect of the embodiments of the present invention, before the detecting a view instruction, input by a user, on any picture, the method further includes: detecting a recording operation startup instruction input by the user; responding to the recording operation startup instruction and starting a recording operation; detecting a recording operation end instruction input by the user; responding to the recording operation end instruction and ending the recording operation, so as to generate an audio file; detecting a photographing operation instruction input by the user; responding to the photographing operation instruction and performing a photographing operation, so as to generate a picture; storing the generated picture; and storing the audio file by using a file name that includes generation time of the picture.

A second aspect of the embodiments of the present invention discloses a computer storage medium, where the computer storage medium stores a program, and when the program is executed, all steps of the picture displaying method disclosed in the first aspect of the embodiments of the present invention are included.

A third aspect of the embodiments of the present invention discloses a picture displaying apparatus, and the apparatus includes: a detecting unit, configured to detect a view instruction, input by a user, on any picture; a first outputting unit, configured to respond to the view instruction detected by the detecting unit and output the picture; an acquiring unit, configured to acquire generation time of the picture from exchangeable image file EXIF information of the picture output by the first outputting unit; a querying unit, configured to query whether an audio file with a file name including the generation time, which is acquired by the acquiring unit, of the picture is stored; and a second outputting unit, configured to, when a querying result of the querying unit is yes, output the audio file found by querying by the querying unit.

In a first possible implementation manner of the third aspect of the embodiments of the present invention, the apparatus further includes a displaying unit, configured to, after the querying unit finds, by querying, that the audio file with a file name including the generation time, which is acquired by the acquiring unit, of the picture is stored, display an audio playback button on the picture output by the first outputting unit. The detecting unit is further configured to detect an operation instruction, input by the user, on the audio playback button displayed on the picture output by the first outputting unit, respond to the operation instruction, and trigger the second outputting unit to perform the step of outputting the audio file found by querying by the querying unit.

With reference to the third aspect of the embodiments of the present invention or the first possible implementation manner of the third aspect of the embodiments of the present invention, in a second possible implementation manner of the third aspect of the embodiments of the present invention, the apparatus further includes: a recording unit, configured to detect a recording operation startup instruction input by the user, respond to the recording operation startup instruction, and start a recording operation; a shooting unit, configured to detect a photographing operation instruction input by the user, respond to the photographing operation instruction, and perform a photographing operation, so as to generate a picture. The recording unit is further configured to detect a recording operation end instruction input by the user, respond to the recording operation end instruction, and end the recording operation, so as to generate an audio file; and a storing unit, configured to store the picture generated by the shooting unit. The storing unit is further configured to store, by using a file name that includes generation time of the picture, the audio file generated by the recording unit.

A fourth aspect of the embodiments of the present invention discloses a terminal device, which includes a processor; a display screen, a microphone, a camera, and a loudspeaker that are connected to the processor by using a user interface; a memory that is connected to the processor by using a bus; a coupler that is connected to the processor by using various network interfaces; and an antenna that is connected to the coupler, where the memory stores a group of program code, and the processor is configured to invoke the program code stored in the memory to perform the following operations: detecting a view instruction, input by a user, on any picture; responding to the view instruction and outputting the picture; acquiring generation time of the picture from exchangeable image file EXIF information of the picture; and querying whether an audio file with a file name including the generation time of the picture is stored, and if the audio file is stored, outputting the audio file.

In a first possible implementation manner of the fourth aspect of the embodiments of the present invention, after querying that the audio file with a file name including the generation time of the picture is stored and before outputting the audio file, the processor further performs the following operations: displaying an audio playback button on the output picture; detecting an operation instruction, input by the user, on the audio playback button; and responding to the operation instruction and performing the step of outputting the audio file.

With reference to the fourth aspect of the embodiments of the present invention or the first possible implementation manner of the fourth aspect of the embodiments of the present invention, in a second possible implementation manner of the fourth aspect of the embodiments of the present invention, before detecting the view instruction, input by the user, on any picture, the processor further performs the following operations detecting a recording operation startup instruction input by the user; responding to the recording operation startup instruction and starting a recording operation; detecting a photographing operation instruction input by the user; responding to the photographing operation instruction and performing a photographing operation, so as to generate a picture; detecting a recording operation end instruction input by the user; responding to the recording operation end instruction and ending the recording operation, so as to generate an audio file; storing the generated picture; and storing the audio file by using a file name that includes generation time of the picture.

With reference to the fourth aspect of the embodiments of the present invention or the first possible implementation manner of the fourth aspect of the embodiments of the present invention, in a third possible implementation manner of the fourth aspect of the embodiments of the present invention, before detecting the view instruction, input by the user, on any picture, the processor further performs the following operations: detecting a photographing operation instruction input by the user; responding to the photographing operation instruction and performing a photographing operation, so as to generate a picture; storing the generated picture; detecting a recording operation startup instruction input by the user; responding to the recording operation startup instruction and starting a recording operation; detecting a recording operation end instruction input by the user; responding to the recording operation end instruction and ending the recording operation, so as to generate an audio file; and storing the audio file by using a file name that includes generation time of the picture.

With reference to the fourth aspect of the embodiments of the present invention or the first possible implementation manner of the fourth aspect of the embodiments of the present invention, in a fourth possible implementation manner of the fourth aspect of the embodiments of the present invention, before detecting the view instruction, input by the user, on any picture, the processor further performs the following operations: detecting a recording operation startup instruction input by the user; responding to the recording operation startup instruction and starting a recording operation; detecting a recording operation end instruction input by the user; responding to the recording operation end instruction and ending the recording operation, so as to generate an audio file; detecting a photographing operation instruction input by the user; responding to the photographing operation instruction and performing a photographing operation, so as to generate a picture; storing the generated picture; and storing the audio file by using a file name that includes generation time of the picture.

In the embodiments of the present invention, after a view instruction, input by a user, on any picture is detected, the picture may be output; generation time of the picture is further acquired from EXIF information of the picture; and whether an audio file with a file name including the generation time of the picture is stored is queried, and if the audio file is stored, the audio file found by querying is output. It can be learned that, by implementing the embodiments of the present invention, the user can not only obtain a static image directly from the picture, but also obtain audio information around a shooting scene in addition to the static image, thereby keeping more memories for the user and improving user experience.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The embodiments of the present invention disclose a picture displaying method and apparatus, and a terminal device, so that a user can not only obtain a static image directly from a picture, but also obtain audio information around a shooting scene in addition to the static image, thereby keeping more memories for the user and improving user experience. The following separately gives detailed descriptions.

Figure 1:
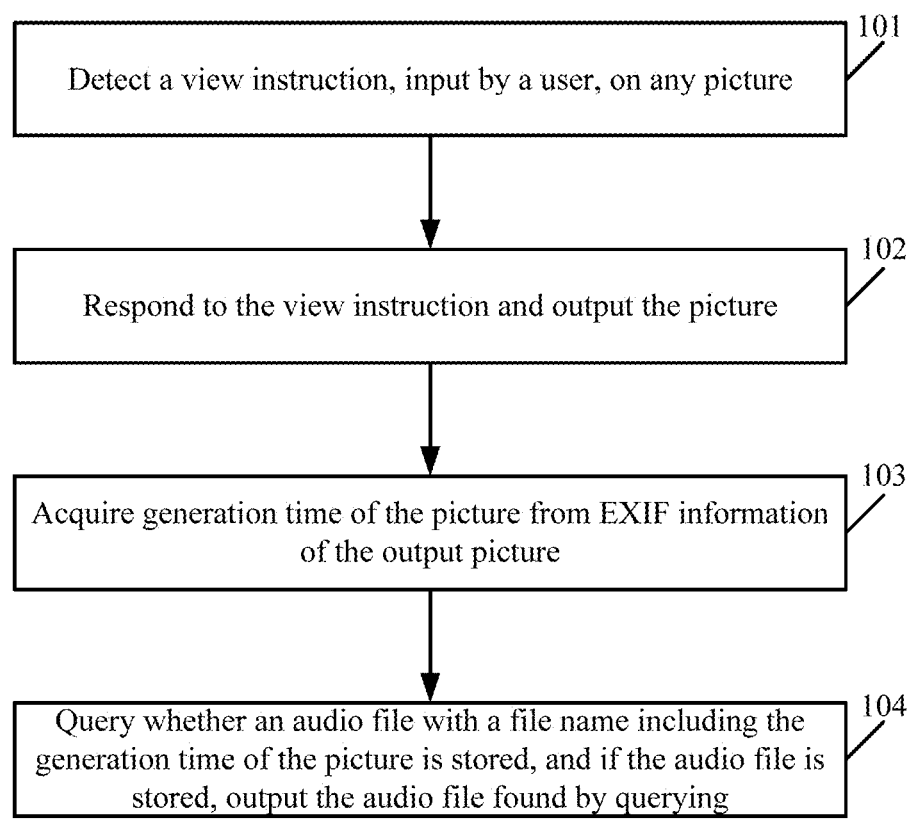
FIG. 1 is a schematic flowchart of a picture displaying method according to an embodiment of the present invention.

Referring to FIG. 1, FIG. 1 is a schematic flowchart of a picture displaying method according to an embodiment of the present invention. The picture displaying method shown in FIG. 1 may include the following steps.

101. Detect a view instruction, input by a user, on any picture.

In this embodiment of the present invention, a terminal device may detect the view instruction, input by the user, on any picture. The terminal device may include a terminal device that has a photographing function and a recording function, for example, a smartphone (for example, an Android phone and an iOS phone), a tablet computer, a personal digital assistant (PDA) and a mobile Internet device (MID), or a digital camera. In this embodiment of the present invention, the terminal device further includes a PC or an intelligent device that has an externally-connected or built-in camera and microphone, which is not limited in this embodiment of the present invention. In this embodiment of the present invention, the terminal device may include at least one processor, and the terminal device may work under control of the at least one processor.

In this embodiment of the present invention, the view instruction, detected by the terminal device and input by the user, on any picture may include a tap or double-tap instruction, input by the user, on a thumbnail of any picture, and may further include an instruction, input by the user, on a local storage address of any picture. In addition, the view instruction, detected by the terminal device and input by the user, on any picture may further include a view instruction, input (by sliding to the left or to the right) by the user by using a display screen, on any picture.

102. Respond to the view instruction and output the picture.

In this embodiment of the present invention, the terminal device may respond to the view instruction, and use a display screen of the terminal device to output a picture that is in a gallery of the terminal device and corresponding to the view instruction.

In this embodiment of the present invention, the picture output by the terminal device by using the display screen may be a picture on which beautification editing (for example, feathering) is performed in advance.

103. Acquire generation time of the picture from EXIF information of the output picture.

In this embodiment of the present invention, the terminal device may acquire the generation time of the picture from the EXIF information of the output picture.

The EXIF information of the picture is a series of information that is collected by the terminal device (for example, a smartphone) in a picture shooting process, and the information is generally placed in a header of a JPEG/TIFF file. That is, the EXIF information is a group of shooting parameters embedded in a JPEG/TIFF picture file format, and the EXIF information mainly includes a large amount of information related to shooting conditions at site, such as an aperture, a shutter, ISO, and generation time during shooting, and may further include information such as a brand model, color code, and the Global Positioning System (GPS) of the terminal device.

104. Query whether an audio file with a file name including the generation time of the picture is stored, and if the audio file is stored, output the audio file.

In this embodiment of the present invention, the terminal device may query whether the audio file with a file name including the generation time of the picture is stored. If the audio file is stored, the terminal device outputs the audio file found by querying; and if the audio file is not stored, the terminal device does not need to output an audio file.

In this embodiment of the present invention, the generation time of the picture is basically unique. When a file name of a stored audio file includes the generation time of the picture, a mapping relationship between the picture and the audio file may be implemented.

In this embodiment of the present invention, the picture and its mapped audio file are mutually independent standard files that the user can view and edit at will, and after editing, a mapping relationship between the picture and its mapped audio file remains unchanged.

It can be learned that, by using a picture displaying method described in FIG. 1, a user can not only obtain a static image directly from a picture, but also obtain audio information around a shooting scene in addition to the static image, thereby keeping more memories for the user and improving user experience.

Figure 2A:
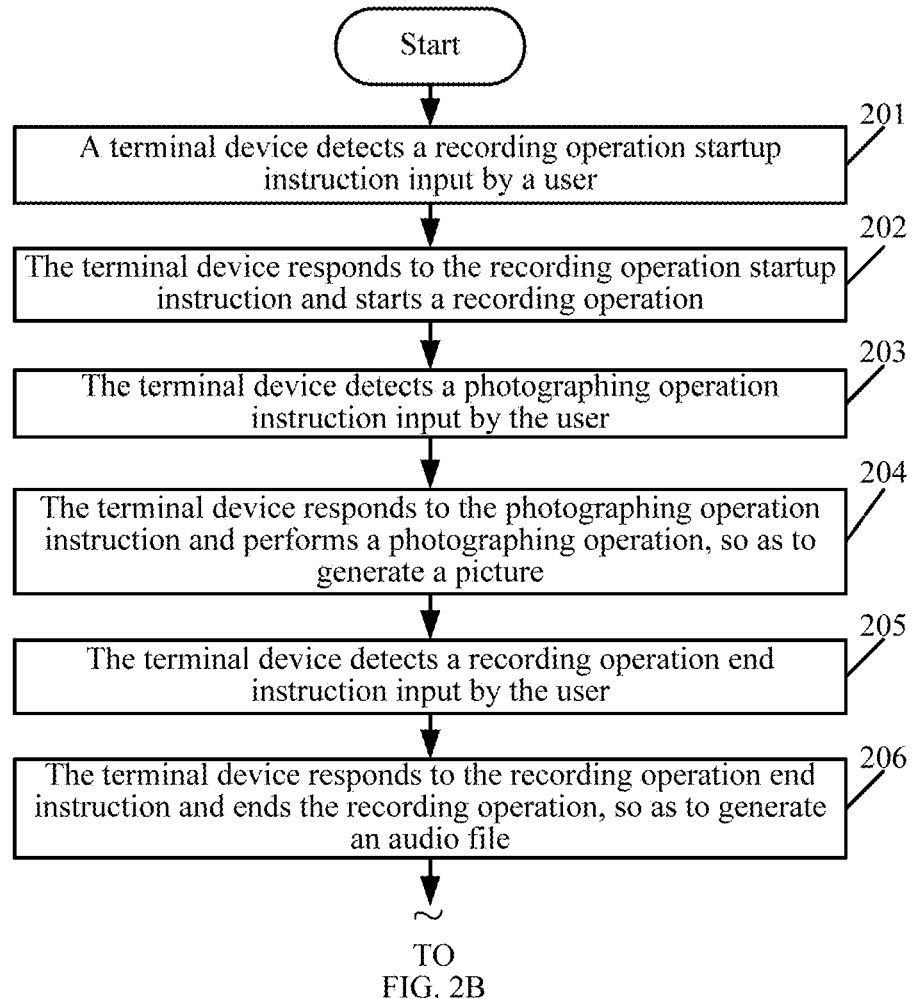
FIG. 2A and FIG. 2B are a schematic flowchart of another picture displaying method according to an embodiment of the present invention.
Figure 2B:
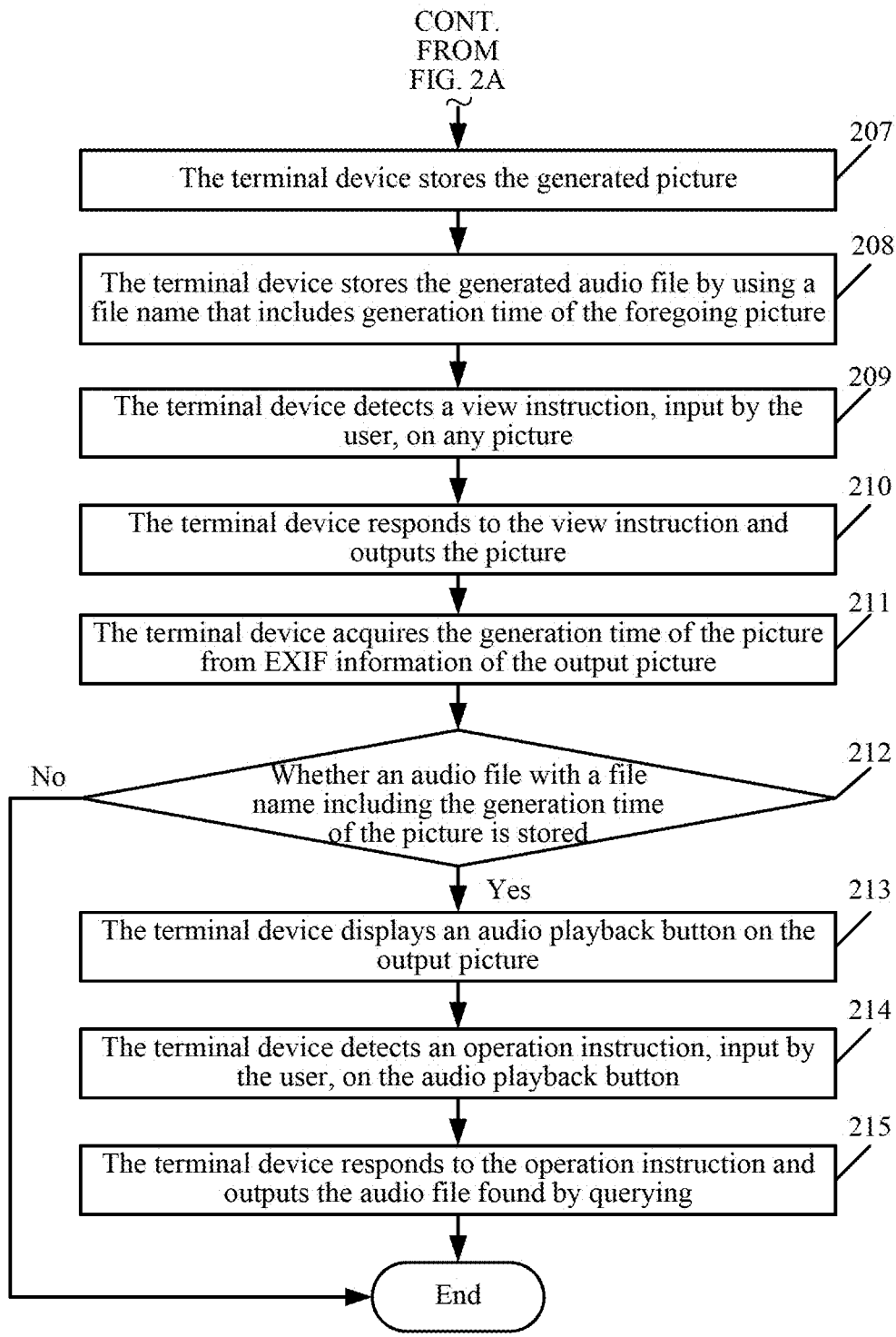

Referring to FIG. 2A and FIG. 2B, FIG. 2A and FIG. 2B are a schematic flowchart of another picture displaying method according to an embodiment of the present invention. The picture displaying method shown in FIG. 2A and FIG. 2B may include the following steps.

201. A terminal device detects a recording operation startup instruction input by a user.

202. The terminal device responds to the recording operation startup instruction and starts a recording operation.

203. The terminal device detects a photographing operation instruction input by the user.

204. The terminal device responds to the photographing operation instruction and performs a photographing operation, so as to generate a picture.

205. The terminal device detects a recording operation end instruction input by the user.

206. The terminal device responds to the recording operation end instruction and ends the recording operation, so as to generate an audio file.

207. The terminal device stores the generated picture.

208. The terminal device stores the generated audio file by using a file name that includes generation time of the foregoing picture.

In this embodiment of the present invention, the generation time of the picture is basically unique. By storing the generated audio file by using the file name that includes generation time of the foregoing picture, a mapping relationship between the foregoing picture and the generated audio file may be implemented.

In this embodiment of the present invention, the picture and its mapped audio file are mutually independent standard files that the user may view and edit at will, and after editing, a mapping relationship between the picture and its mapped audio file remains unchanged.

In this embodiment of the present invention, by performing the foregoing step 201 to step 208 successively, recording of the audio file may be implemented in a picture shooting process, so that execution efficiency of the terminal device can be improved.

209. The terminal device detects a view instruction, input by the user, on any picture.

In this embodiment of the present invention, the view instruction, detected by the terminal device and input by the user, on any picture may include a tap or double-tap instruction, input by the user, on a thumbnail of any picture, and may further include an instruction, input by the user, on a local storage address of any picture. In addition, the view instruction, detected by the terminal device and input by the user, on any picture may further include a view instruction, input (by sliding to the left or to the right) by the user by using a display screen, on any picture.

210. The terminal device responds to the view instruction and outputs the picture.

In this embodiment of the present invention, the terminal device responds to the view instruction, and uses a display screen of the terminal device to output a picture that is in a gallery of the terminal device and corresponding to the view instruction.

In this embodiment of the present invention, the picture output by the terminal device by using the display screen may be a picture on which beautification editing (for example, feathering) is performed in advance.

211. The terminal device acquires generation time of the picture from EXIF information of the output picture.

The EXIF information of the picture is a series of information that is collected by the terminal device (for example, a smartphone) in a picture shooting process, and the information is generally placed in a header of a JPEG/TIFF file. That is, the EXIF information is a group of shooting parameters embedded in a JPEG/TIFF picture file format, and the EXIF information mainly includes a large amount of information related to shooting conditions at site, such as an aperture, a shutter, ISO, and generation time during shooting, and may further include information such as a brand model, color code, and the Global Positioning System (GPS) of the terminal device.

212. The terminal device queries whether an audio file with a file name including the generation time of the picture is stored, and if the audio file is stored, perform step 213; and if the audio file is not stored, end the procedure.

213. The terminal device displays an audio playback button on the output picture.

Figure 3:
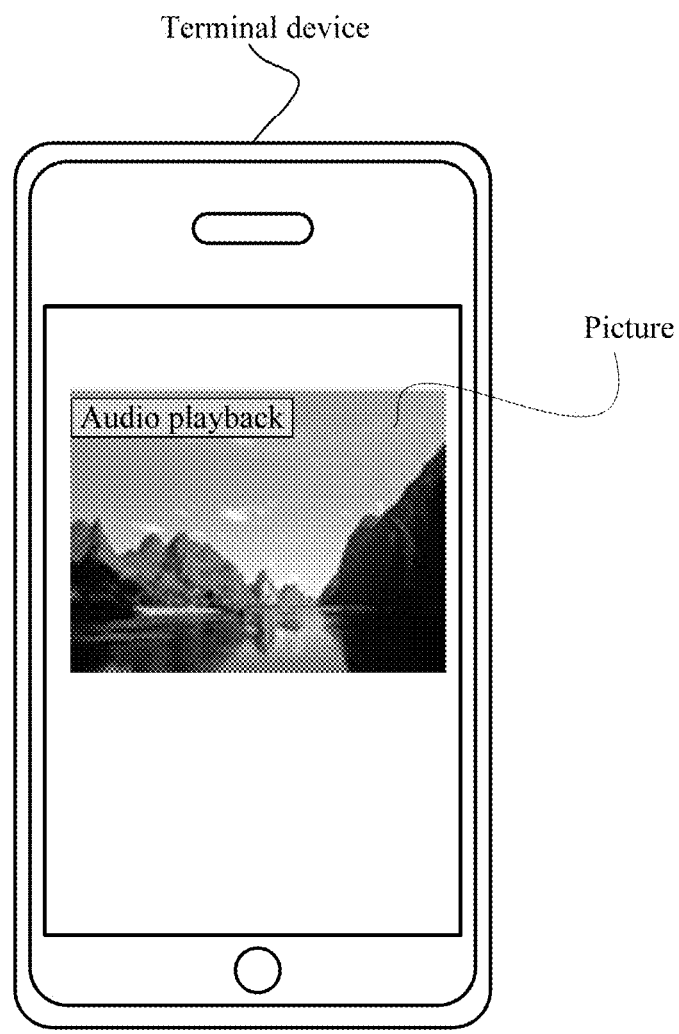
FIG. 3 is a schematic diagram of a picture that includes an audio playback button and is output by a terminal device according to an embodiment of the present invention.

In this embodiment of the present invention, as shown in FIG. 3, when the terminal device queries that the audio file with a file name including the generation time of the picture is stored, the terminal device displays the audio playback button on the output picture. The user may perform an operation (for example, a tap or a double-tap) on the audio playback button to input an operation instruction on the audio playback button to the terminal device.

214. The terminal device detects an operation instruction, input by the user, on the audio playback button.

In this embodiment of the present invention, the terminal device may detect a tap or double-tap operation instruction, input by the user, on the audio playback button.

215. The terminal device responds to the operation instruction and outputs the audio file found by querying.

In this embodiment of the present invention, the terminal device may respond to the operation instruction and output the audio file found by querying by using a loudspeaker.

It can be learned that, by using a picture displaying method described in FIG. 2A and FIG. 2B, a user can not only obtain a static image directly from a picture, but also obtain audio information around a shooting scene in addition to the static image, thereby keeping more memories for the user and improving user experience.

Figure 4A:
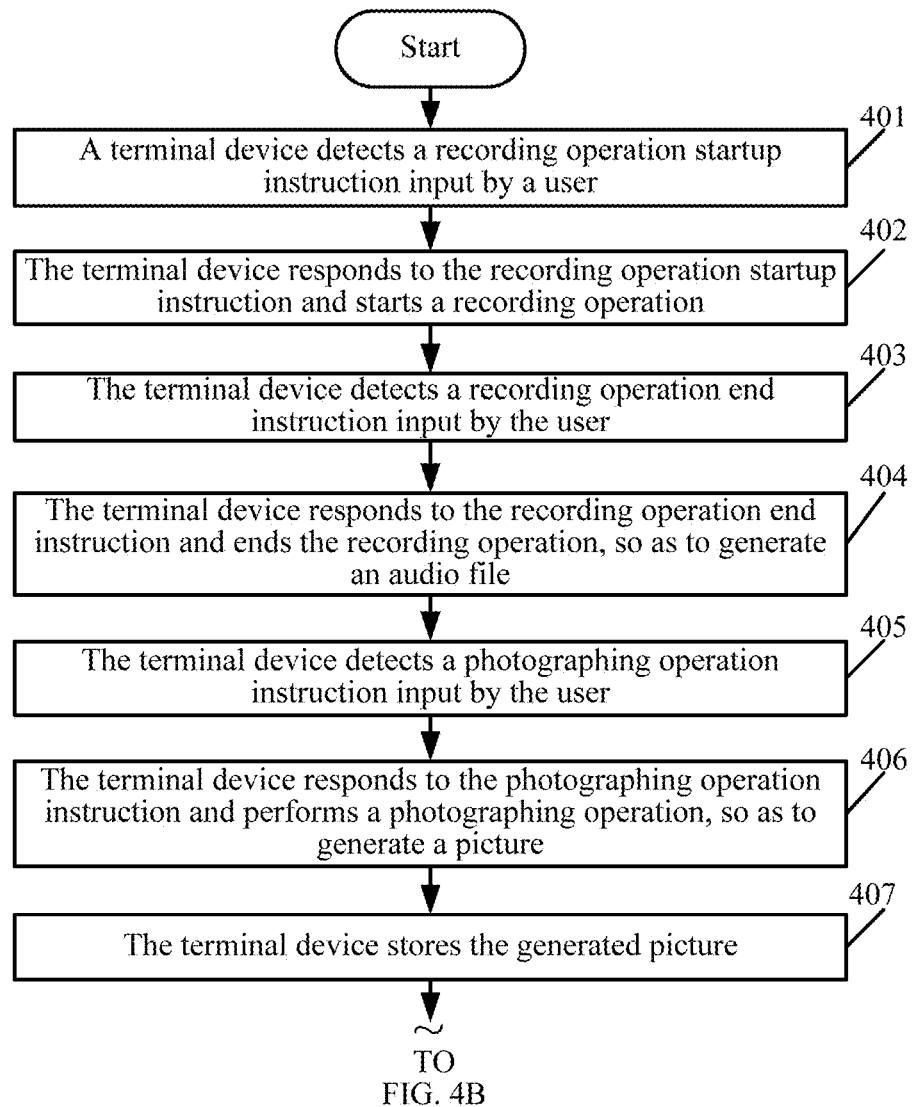
FIG. 4A and FIG. 4B are a schematic flowchart of another picture displaying method according to an embodiment of the present invention.
Figure 4B:
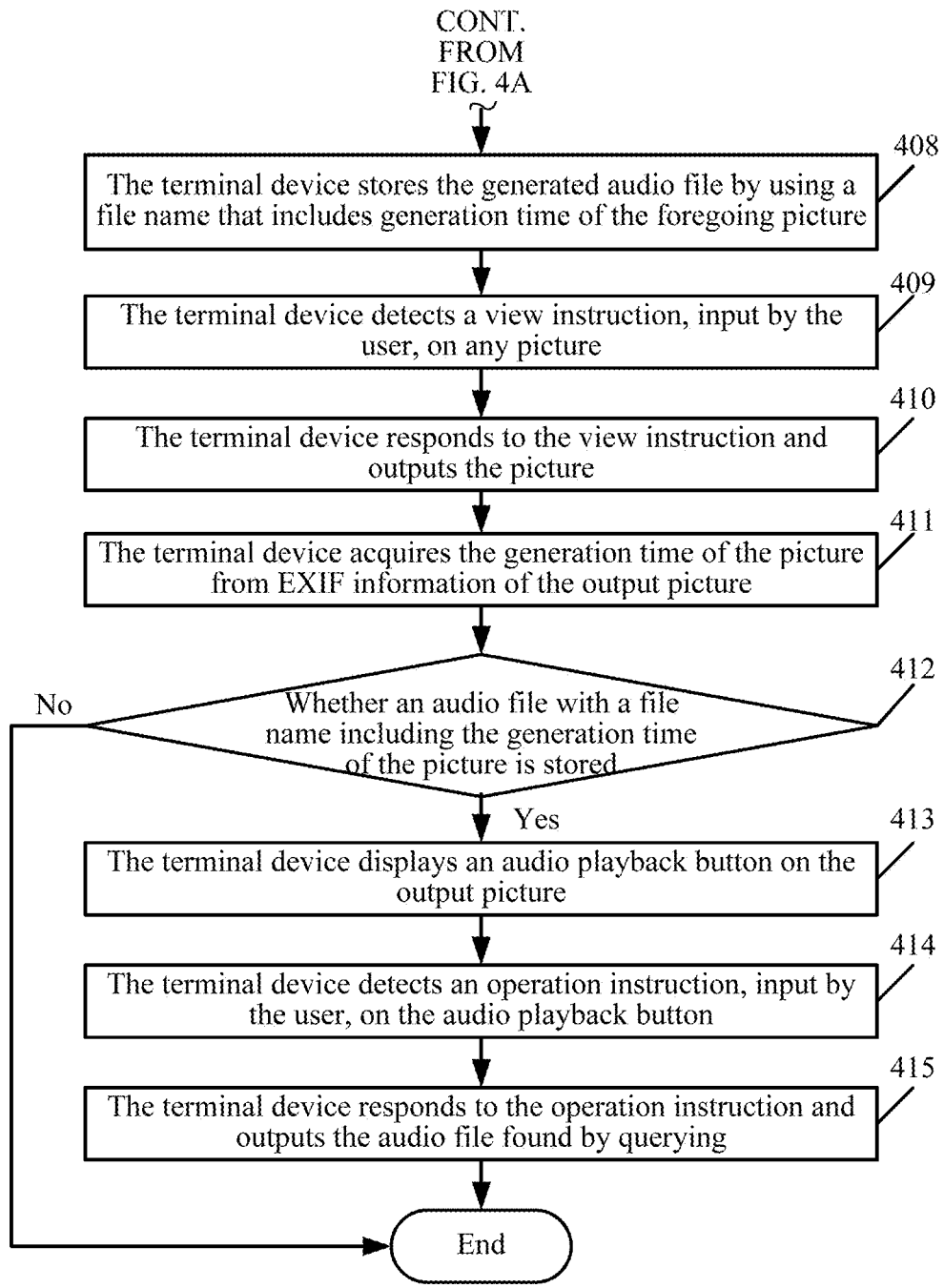

Referring to FIG. 4A and FIG. 4B, FIG. 4A and FIG. 4B are a schematic flowchart of another picture displaying method according to an embodiment of the present invention. The picture displaying method shown in FIG. 4A and FIG. 4B may include the following steps.

401. A terminal device detects a recording operation startup instruction input by a user.

402. The terminal device responds to the recording operation startup instruction and starts a recording operation.

403. The terminal device detects a recording operation end instruction input by the user.

404. The terminal device responds to the recording operation end instruction and ends the recording operation, so as to generate an audio file.

405. The terminal device detects a photographing operation instruction input by the user.

406. The terminal device responds to the photographing operation instruction and performs a photographing operation, so as to generate a picture.

407. The terminal device stores the generated picture.

408. The terminal device stores the generated audio file by using a file name that includes generation time of the foregoing picture.

In this embodiment of the present invention, by performing the foregoing step 401 to step 408 successively, shooting of the picture may be implemented after recording of the audio file is finished, thereby making recording of the audio file and shooting of the picture more selective.

In this embodiment of the present invention, step 409 to step 415 in the picture displaying method described in FIG.

4A and FIG. 4B are the same as step 209 to step 215 in the picture displaying method described in FIG. 2A and FIG. 2B, which are not described again in this embodiment of the present invention.

It can be learned that, by using a picture displaying method described in FIG. 4A and FIG. 4B, a user can not only obtain a static image directly from a picture, but also obtain audio information around a shooting scene in addition to the static image, thereby keeping more memories for the user and improving user experience.

Figure 5A:
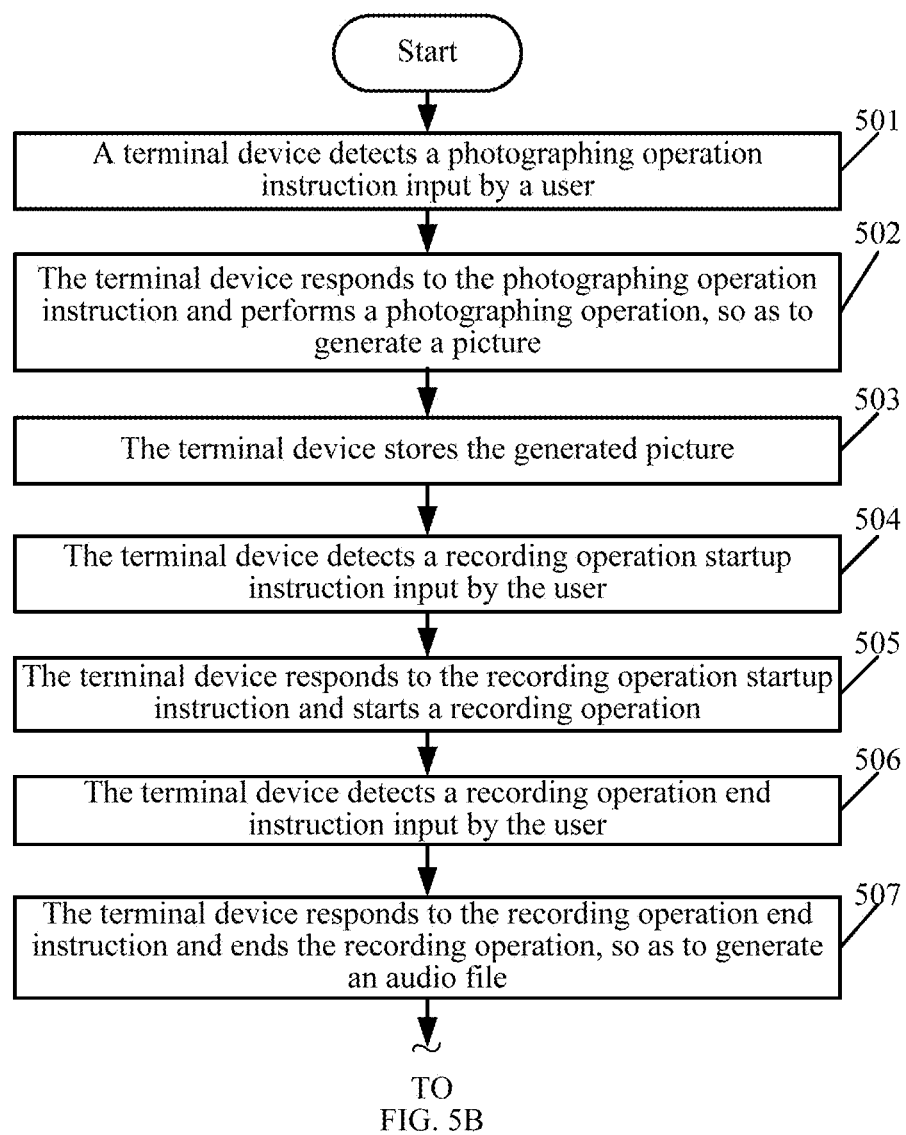
FIG. 5A and FIG. 5B are a schematic flowchart of another picture displaying method according to an embodiment of the present invention.
Figure 5B:
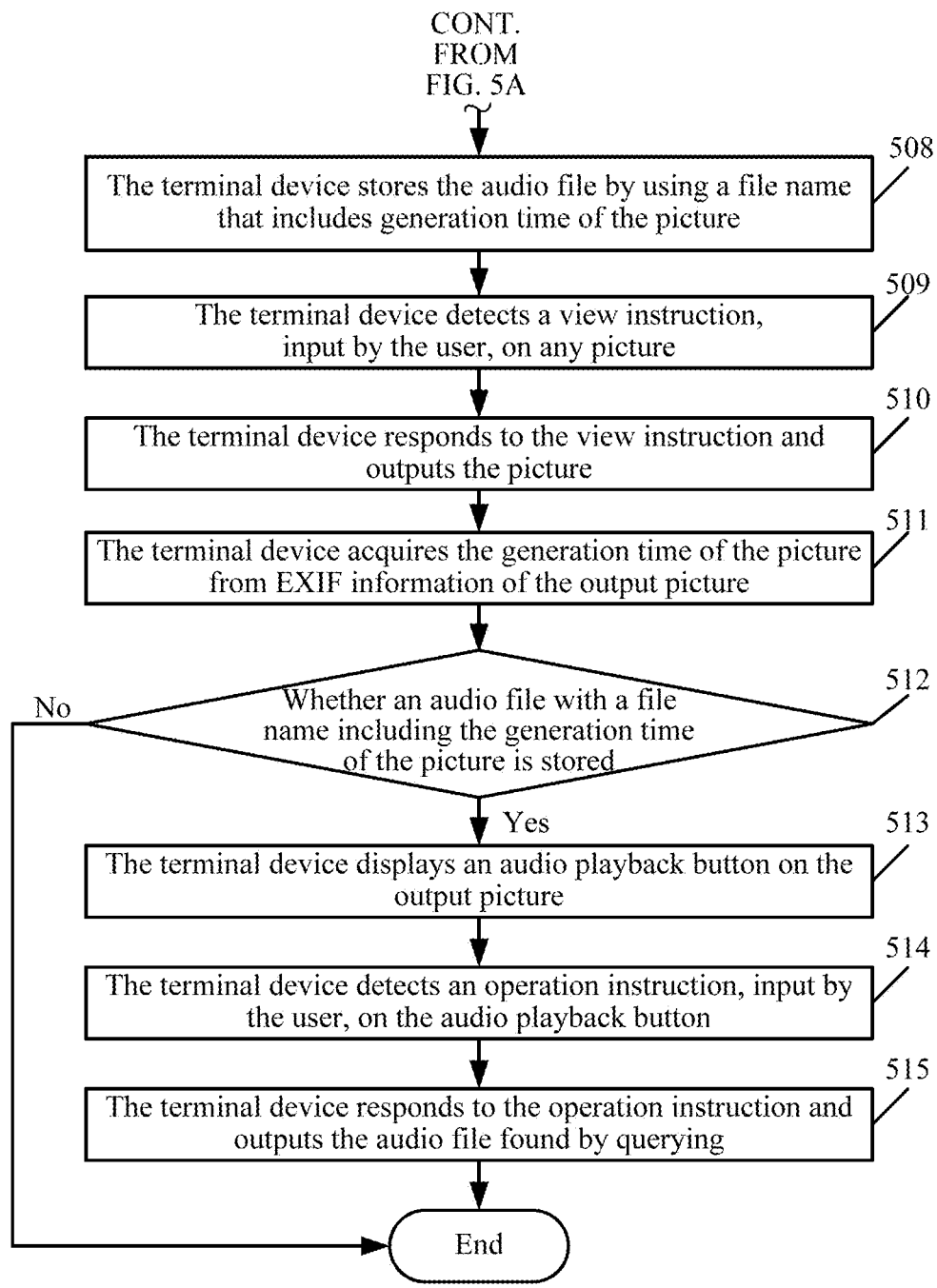

Referring to FIG. 5A and FIG. 5B, FIG. 5A and FIG. 5B are a schematic flowchart of another picture displaying method according to an embodiment of the present invention. The picture displaying method shown in FIG. 5A and FIG. 5B may include the following steps.

501. A terminal device detects a photographing operation instruction input by a user.

502. The terminal device responds to the photographing operation instruction and performs a photographing operation, so as to generate a picture.

503. The terminal device stores the generated picture.

504. The terminal device detects a recording operation startup instruction input by the user.

505. The terminal device responds to the recording operation startup instruction and starts a recording operation.

506. The terminal device detects a recording operation end instruction input by the user.

507. The terminal device responds to the recording operation end instruction and ends the recording operation, so as to generate an audio file.

508. The terminal device stores the audio file by using a file name that includes generation time of the picture.

In this embodiment of the present invention, by performing the foregoing step 501 to step 508 successively, recording of the audio file may be implemented after shooting of the picture is finished, thereby making recording of the audio file and shooting of the picture more selective.

In this embodiment of the present invention, step 509 to step 515 in the picture displaying method described in FIG. 5A and FIG. 5B are the same as step 209 to step 215 in the picture displaying method described in FIG. 2A and FIG. 2B, which are not described again in this embodiment of the present invention.

It can be learned that, by using a picture displaying method described in FIG. 5A and FIG. 5B, a user can not only obtain a static image directly from a picture, but also obtain audio information around a shooting scene in addition to the static image, thereby keeping more memories for the user and improving user experience.

Figure 6:
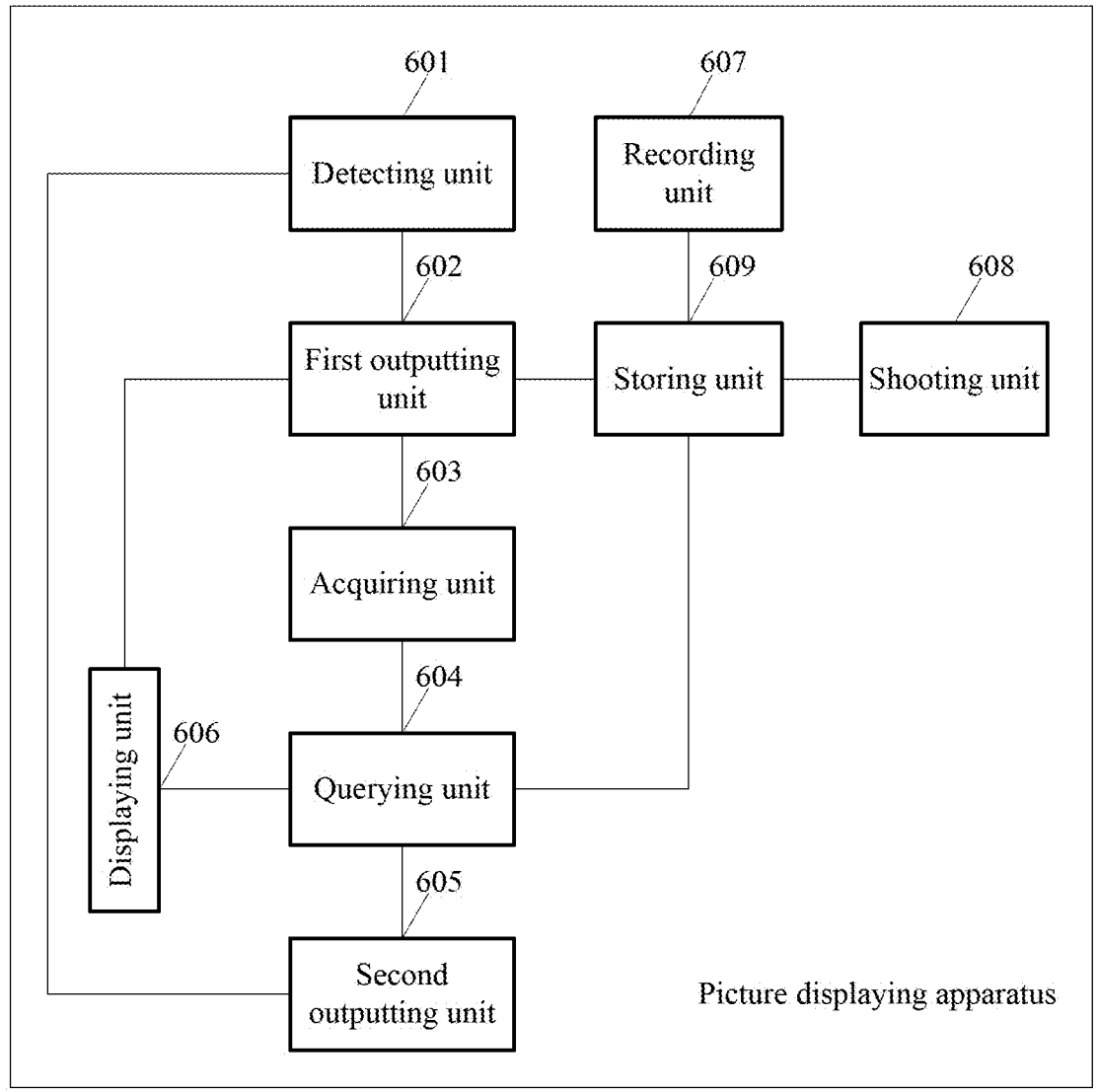
FIG. 6 is a schematic structural diagram of a picture displaying apparatus according to an embodiment of the present invention.

Referring to FIG. 6, FIG. 6 is a schematic structural diagram of a picture displaying apparatus according to an embodiment of the present invention. The picture displaying apparatus shown in FIG. 6 may be applied to various terminal devices that have a photographing function and a recording function. The picture displaying apparatus shown in FIG. 6 may include: a detecting unit 601, configured to detect a view instruction, input by a user, on any picture; a first outputting unit 602, configured to respond to the view instruction detected by the detecting unit 601 and output the picture; an acquiring unit 603, configured to acquire generation time of the picture from EXIF information of the picture output by the first outputting unit 602; a querying unit 604, configured to query whether an audio file with a file name including the generation time, which is acquired by the acquiring unit 603, of the picture is stored; and a second outputting unit 605, configured to, when a querying result of the querying unit 604 is yes, output the audio file found by querying by the querying unit 604.

In this embodiment of the present invention, the view instruction, detected by the detecting unit 601 and input by the user, on any picture may include a tap or double-tap instruction, input by the user, on a thumbnail of any picture, and may further include an instruction, input by the user, on a local storage address of any picture. In addition, the view instruction, detected by the detecting unit 601 and input by the user, on any picture may further include a view instruction, input (by sliding to the left or to the right) by the user by using a display screen, on any picture.

In an embodiment, the picture displaying apparatus shown in FIG. 6 may further include a displaying unit 606, configured to, after the querying unit 604 finds, by querying, that the audio file with a file name including the generation time, which is acquired by the acquiring unit 603, of the picture is stored, display an audio playback button on the picture output by the first outputting unit 602.

Correspondingly, the detecting unit 601 is further configured to detect an operation instruction, input by the user, on the audio playback button displayed on the picture output by the first outputting unit 602, respond to the operation instruction, and trigger the second outputting unit 605 to perform the step of outputting the audio file found by querying by the querying unit 604.

In this embodiment of the present invention, displaying, by the displaying unit 606, the audio playback button on the picture output by the first outputting unit 602 may be shown in FIG. 3.

In an embodiment, the picture displaying apparatus shown in FIG. 6 may further include a recording unit 607, a shooting unit 608, and a storing unit 609, where a working process of the recording unit 607, the shooting unit 608, and the storing unit 609 may be as follows:

11. The recording unit 607 is configured to detect a recording operation startup instruction input by the user, respond to the recording operation startup instruction, and start a recording operation.

12. The shooting unit 608 is configured to detect a photographing operation instruction input by the user, respond to the photographing operation instruction, and perform a photographing operation, so as to generate a picture.

13. The recording unit 607 is further configured to detect a recording operation end instruction input by the user, respond to the recording operation end instruction, and end the recording operation, so as to generate an audio file.

14. The storing unit 609 is configured to store the picture generated by the shooting unit 608.

15. The storing unit 609 is further configured to store, by using a file name that includes generation time of the picture, the audio file generated by the recording unit 607.

In another embodiment, the working process of the recording unit 607, the shooting unit 608, and the storing unit 609 may further be as follows:

21. The shooting unit 608 is configured to detect a photographing operation instruction input by the user, respond to the photographing operation instruction, and perform a photographing operation, so as to generate a picture.

22. The storing unit 609 is configured to store the picture generated by the shooting unit 608.

23. The recording unit 607 is configured to detect a recording operation startup instruction input by the user, respond to the recording operation startup instruction, and start a recording operation.

24. The recording unit 607 is further configured to detect a recording operation end instruction input by the user, respond to the recording operation end instruction, and end the recording operation, so as to generate an audio file.

25. The storing unit 609 is further configured to store, by using a file name that includes generation time of the picture, the audio file generated by the recording unit 607.

In still another embodiment, the working process of the recording unit 607, the shooting unit 608, and the storing unit 609 may further be as follows:

31. The recording unit 607 is configured to detect a recording operation startup instruction input by the user, respond to the recording operation startup instruction, and start a recording operation.

32. The recording unit 607 is further configured to detect a recording operation end instruction input by the user, respond to the recording operation end instruction, and end the recording operation, so as to generate an audio file.

33. The shooting unit 608 is configured to detect a photographing operation instruction input by the user, respond to the photographing operation instruction, and perform a photographing operation, so as to generate a picture.

34. The storing unit 609 is configured to store the picture generated by the shooting unit 608.

35. The storing unit 609 is further configured to store, by using a file name that includes generation time of the picture, the audio file generated by the recording unit 607.

In this embodiment of the present invention, the first outputting unit 602 is specifically configured to respond to the view instruction detected by the detecting unit 601 to output the picture stored by the storing unit 609.

In this embodiment of the present invention, the querying unit 604 is specifically configured to query whether the audio file with a file name including the generation time, which is acquired by the acquiring unit 603, of the picture is stored in the storing unit 609.

It can be learned that by using a picture displaying apparatus described in FIG. 6, a user can not only obtain a static image directly from a picture, but also obtain audio information around a shooting scene in addition to the static image, thereby keeping more memories for the user and improving user experience.

Figure 7:
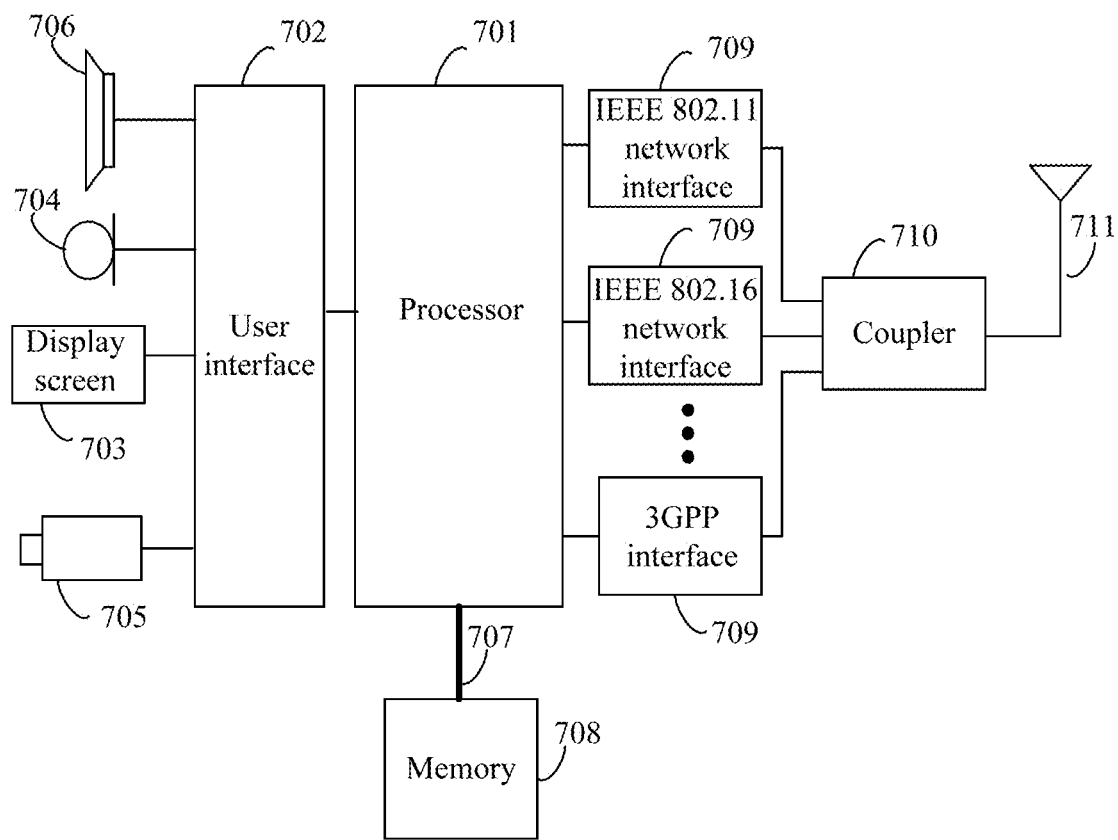
FIG. 7 is a schematic structural diagram of a terminal device according to an embodiment of the present invention.

Referring to FIG. 7, FIG. 7 is a schematic structural diagram of a terminal device according to an embodiment of the present invention. The terminal device shown in FIG. 7 may include a processor 701; a display screen 703, a microphone 704, a camera 705, and a loudspeaker 706 that are connected to the processor 701 by using a user interface 702; a memory 708 that is connected to the processor 701 by using a bus 707; a coupler 710 that is connected to the processor 701 by using various network interfaces 709; and an antenna 711 that is connected to the coupler 710, where the various network interfaces 709 may include several network interfaces of different standards, such as an IEEE 802.11 network interface, an IEEE 802.16 network interface, and a 3GPP network interface, which is not limited in this embodiment of the present invention. Output of the IEEE 802.11 network interface, the IEEE 802.16 network interface, and the 3GPP network interface is coupled by the coupler 710 to the antenna 711 for transmission. The loudspeaker 706 is configured to output an audio file; the microphone 704 is configured to record an audio file; the display screen 703 is configured to display a picture, information, a web page, and the like; the camera 705 is configured to shoot a picture and a video. The memory 708 is configured to store a group of program code, and the processor 701 is configured to invoke the program code stored in the memory 708 to perform the following operations: detecting a view instruction, input (for example, input by using the display screen 703) by a user, on any picture; responding to the view instruction and outputting, by using the display screen 703, the picture; acquiring generation time of the picture from information of the picture output by using the display screen 703; and querying whether an audio file with a file name including the generation time of the picture is stored, and if the audio file is stored, outputting, by using the loudspeaker 706, the audio file.

In an embodiment, after querying that the audio file with a file name including the generation time of the picture is stored and before outputting, by using the loudspeaker 706, the audio file, the processor 701 further performs the following operations: displaying an audio playback button (shown in FIG. 3) on the picture output by the display screen 703; detecting an operation instruction, input (for example, input by using the display screen 703) by the user, on the audio playback button; and responding to the operation instruction and performing the step of outputting, by using the loudspeaker 706, the audio file.

In an embodiment, before detecting the view instruction, input by the user, on any picture, the processor 701 may further successively perform the following operations: detecting a recording operation startup instruction input (for example, input by using the display screen 703) by the user; responding to the recording operation startup instruction and starting a recording operation; detecting a photographing operation instruction input (for example, input by using the display screen 703) by the user; responding to the photographing operation instruction and performing a photographing operation, so as to generate a picture; detecting a recording operation end instruction input (for example, input by using the display screen 703) by the user; responding to the recording operation end instruction and ending the recording operation, so as to generate an audio file; storing the generated picture; and storing the audio file by using a file name that includes generation time of the picture.

In this implementation manner, the processor 701 may store the generated picture in the memory 708, and store, by using the file name that includes the generation time of the picture, the audio file in the memory 708.

In an embodiment, before detecting the view instruction, input by the user, on any picture, the processor 701 may further successively perform the following operations: detecting a photographing operation instruction input (for example, input by using the display screen 703) by the user; responding to the photographing operation instruction and performing a photographing operation, so as to generate a picture; storing the generated picture; detecting a recording operation startup instruction input (for example, input by using the display screen 703) by the user; responding to the recording operation startup instruction and starting a recording operation; detecting a recording operation end instruction input (for example, input by using the display screen 703) by the user; responding to the recording operation end instruction and ending the recording operation, so as to generate an audio file; and storing the audio file by using a file name that includes generation time of the picture.

In this implementation manner, the processor 701 may store the generated picture in the memory 708, and store, by using the file name that includes the generation time of the picture, the audio file in the memory 708.

In an embodiment, before detecting the view instruction, input by the user, on any picture, the processor 701 may further successively perform the following operations:

detecting a recording operation startup instruction input (for example, input by using the display screen 703) by the user; responding to the recording operation startup instruction and starting a recording operation; detecting a recording operation end instruction input (for example, input by using the display screen 703) by the user; responding to the recording operation end instruction and ending the recording operation, so as to generate an audio file; detecting a photographing operation instruction input (for example, input by using the display screen 703) by the user; responding to the photographing operation instruction and performing a photographing operation, so as to generate a picture; storing the generated picture; and storing the audio file by using a file name that includes generation time of the picture.

In this implementation manner, the processor 701 may store the generated picture in the memory 708, and store, by using the file name that includes the generation time of the picture, the audio file in the memory 708.

It should be noted that only components required for implementing the picture displaying method disclosed in the embodiment of the present invention are marked in the terminal device shown in FIG. 7. Other components such as a physical key, a keyboard, a power supply, a housing that the terminal device can have are not marked in this embodiment of the present invention because this does not affect implementation of this embodiment of the present invention. In addition, the user may also input the foregoing various instructions to the terminal device by using the keyboard or the physical key.

It can be learned that by using a terminal device described in FIG. 7, a user can not only obtain a static image directly from a picture, but also obtain audio information around a shooting scene in addition to the static image, thereby keeping more memories for the user and improving user experience.

A person of ordinary skill in the art may understand that all or a part of the steps of the method embodiments may be implemented by a program instructing relevant hardware of terminal device. The program may be stored in a computer readable storage medium. When the program runs, the steps of the method embodiments are performed. The foregoing storage medium includes any medium that can store program code, such as a flash disk, a read-only memory (ROM), a random access memory (RAM), a magnetic disk, or an optical disc.

The foregoing describes in detail the method, the apparatus, and the terminal device for displaying the picture disclosed in the embodiments of the present invention. Specific examples are used in this specification to describe the principle and implementations of the present invention. The descriptions of the foregoing embodiments are merely intended to make the method and core idea of the present invention more comprehensible. In addition, with respect to the implementations and the application scope, modifications may be made by a person of ordinary skill in the art according to the idea of the present invention. Therefore, this specification shall not be construed as a limitation on the present invention.

What is claimed is:

1. A picture displaying method comprising:
   receiving user input indicating a view instruction for a picture;
   acquiring a generation time of the picture from exchangeable image file (EXIF) information of the picture;
   identifying, according to the generation time of the picture acquired from the EXIF information, an audio file that is recorded after shooting of the picture is finished and that has a file name that comprises the generation time of the picture;
   editing, after the picture is stored, after the audio file is stored, and after a mapping relationship between the picture and the audio file is established, at least one of the picture or the audio file independently of another one of the picture or the audio file while maintaining the mapping relationship between the picture and the audio file after the editing; and
   displaying, on an output display of the picture, an audio playback button of the audio file in response to identifying the audio file having the file name that comprises the generation time of the picture.

2. The method according to claim 1, wherein the method further comprises performing, before receiving user input indicating the view instruction:
   receiving user input indicating a recording operation startup instruction;
   based on the recording operation startup instruction, starting a recording operation;
   receiving user input indicating a photographing operation instruction;
   performing a photographing operation to generate the picture in response to the photographing operation instruction;
   receiving user input indicating a recording operation end instruction;
   based on the recording operation end instruction, ending the recording operation to generate the audio file;
   storing the generated picture; and
   storing the audio file using a file name that comprises a generation time of the picture.

3. The method according to claim 1, wherein the method further comprises performing, before receiving the user input indicating the view instruction:
   receiving user input indicating a photographing operation instruction;
   based on the photographing operation instruction, performing a photographing operation to generate the picture;
   storing the generated picture;
   receiving user input indicating a recording operation startup instruction;
   based on the recording operation startup instruction, starting a recording operation;
   receiving user input indicating a recording operation end instruction;
   based on to the recording operation end instruction, ending the recording operation to generate the audio file; and
   storing the audio file using a file name that comprises generation time of the picture.

4. The method according to claim 1, wherein the method further comprises performing, before receiving the user input indicating the view instruction:
   receiving user input indicating a recording operation startup instruction;
   based on the recording operation startup instruction, starting a recording operation;
   receiving user input indicating a recording operation end instruction;
   based on the recording operation end instruction, ending the recording operation to generate the audio file;
   receiving user input indicating a photographing operation instruction;

based on the photographing operation instruction, performing a photographing operation, to generate the picture;

storing the generated picture; and storing the audio file by using a file name that comprises generation time of the picture.

5. The method according to claim 1, wherein the method further comprises performing, after identifying the audio file having a file name that comprises the generation time of the picture:

receiving user input indicating an operation instruction on the audio playback button; and based on the operation instruction, of outputting the audio file.

6. The method according to claim 5, wherein the method further comprises performing, before receiving the user input indicating the view instruction:

receiving user input indicating a recording operation startup instruction;

based on the recording operation startup instruction, starting a recording operation;

receiving user input indicating a photographing operation instruction;

based on the photographing operation instruction, performing a photographing operation to generate the picture;

receiving user input indicating a recording operation end instruction;

based on the recording operation end instruction, ending the recording operation to generate the audio file;

storing the generated picture; and storing the audio file using a file name that comprises generation time of the picture.

7. The method according to claim 5, wherein the method further comprises performing, before receiving the user input indicating the view instruction:

receiving user input indicating a photographing operation;

based on the photographing operation, performing a photographing operation to generate a picture;

storing the generated picture;

receiving user input indicating a recording operation startup instruction;

based on the recording operation startup instruction, starting a recording operation;

receiving user input indicating a recording operation end instruction;

based on the recording operation end instruction, ending the recording operation to generate an audio file; and storing the audio file by using a file name that comprises a generation time of the picture.

8. The method according to claim 5, wherein the method further comprises performing, before receiving the user input indicating the view instruction:

receiving user input indicating a recording operation startup instruction;

based on the recording operation startup instruction, starting a recording operation;

receiving user input indicating a recording operation end instruction;

based on the recording operation end instruction, ending the recording operation to generate an audio file;

receiving user input indicating a photographing operation instruction;

based on the photographing operation instruction, performing a photographing operation to generate a picture;

storing the generated picture; and storing the audio file using a file name that comprises a generation time of the picture.

9. A non-transitory computer storage medium having stored therein instructions, which when executed by a portable electronic device with a touch screen, cause the device to:

receiving user input indicating a view instruction for a picture;

acquire a generation time of the picture from exchangeable image file (EXIF) information of the picture;

identify, according to the generation time of the picture acquired from the EXIF information, an audio file that is recorded after shooting of the picture is finished and that has a file name that comprises the generation time of the picture;

edit, after the picture is stored, after the audio file is stored, and after a mapping relationship between the picture and the audio file is established, at least one of the picture or the audio file independently of another one of the picture or the audio file while maintaining the mapping relationship between the picture and the audio file after performing the instructions to edit; and display, on an output display of the picture, an audio playback button of the audio file in response to identifying the audio file having the file name that comprises the generation time of the picture.

10. A terminal device comprising:

a processor;

a display screen;

a microphone;

a camera; and a loudspeaker that are connected to the processor by using a user interface;

a non-transitory computer readable memory that is connected to the processor by using a bus;

a coupler that is connected to the processor by using various network interfaces; and an antenna that is connected to the coupler, wherein the memory stores a group of program code, and the program code comprises instructions for:

receiving user input indicating a view instruction for a picture;

acquiring generation time of the picture from exchangeable image file (EXIF) information of the picture;

identifying, according to the generation time of the picture acquired from the EXIF information, an audio file that is recorded after shooting of the picture is finished and that has a file name that comprises the generation time of the picture;

editing, after the picture is stored, after the audio file is stored, and after a mapping relationship between the picture and the audio file is established, at least one of the picture or the audio file independently of another one of the picture or the audio file while maintaining the mapping relationship between the picture and the audio file after performing the instructions for editing; and displaying, on an output display of the picture, an audio playback button of the audio file in response to identifying the audio file having the file name that comprises the generation time of the picture.

11. The terminal device according to claim 10, wherein the program further comprises instructions for performing, after identifying the audio file having a file name that comprises the generation time of the picture:

receiving user input indicating an operation instruction on the audio playback button; and based on the operation instruction, outputting the audio file.

12. The terminal device according to claim 11, wherein the program further comprises instructions for performing, before receiving the user input indicating the view instruction for the picture:

receiving user input indicating a recording operation startup instruction;

based on the recording operation startup instruction, starting a recording operation;

receiving user input indicating a photographing operation instruction;

based on the photographing operation instruction, performing a photographing operation to generate a picture;

receiving user input indicating a recording operation end instruction;

based on the recording operation end instruction, ending the recording operation to generate an audio file;

storing the generated picture; and storing the audio file by using a file name that comprises a generation time of the picture.

13. The terminal device according to claim 11, wherein the program further comprises instructions for performing, before receiving the user input indicating the view instruction for the picture:

receiving user input indicating a photographing operation instruction;

based on the photographing operation instruction, performing a photographing operation to generate a picture;

storing the generated picture;

receiving user input indicating a recording operation startup instruction;

based on the recording operation startup instruction and, starting a recording operation;

receiving user input indicating a recording operation end;

based on receiving the user input indicating the recording operation end, ending the recording operation to generate an audio file; and storing the audio file using a file name that comprises a generation time of the picture.

14. The terminal device according to claim 10, wherein the program further comprises instructions for performing, before receiving the user input indicating the view instruction for the picture:

receiving user input indicating a recording operation startup instruction;

based on the recording operation startup instruction, starting a recording operation;

receiving user input indicating a photographing operation instruction;

based on the photographing operation instruction, performing a photographing operation to generate a picture;

receiving user input indicating a recording operation end instruction;

based on the recording operation end instruction, ending the recording operation to generate an audio file;

storing the generated picture; and storing the audio file using a file name that comprises a generation time of the picture.

15. The terminal device according to claim 10, wherein the program further comprises instructions for performing, before receiving the user input indicating the view instruction for the picture:

receiving user input indicating a photographing operation instruction;

based on the photographing operation instruction, performing a photographing operation to generate a picture;

storing the generated picture;

receiving user input indicating a recording operation startup instruction;

based on the recording operation startup instruction, starting a recording operation;

receiving user input indicating a recording operation end instruction;

based on the recording operation end instruction, ending the recording operation to generate an audio file; and storing the audio file using a file name that comprises a generation time of the picture.

16. The terminal device according to claim 10, wherein the program further comprises instructions for performing, before receiving the user input indicating the view instruction for the picture:

receiving user input indicating a recording operation startup instruction;

based on the recording operation startup instruction, starting a recording operation;

receiving user input indicating a recording operation end instruction;

based on the recording operation end instruction, ending the recording operation to generate an audio file;

receiving user input indicating a photographing operation instruction;

based on the photographing operation instruction, performing a photographing operation to generate a picture;

storing the generated picture; and storing the audio file using a file name that comprises a generation time of the picture.

17. An electronic apparatus comprising:

a display screen;

a microphone;

a camera;

one or more processors; and a non-transitory computer readable medium storing a program to be executed by the one or more processors, the program including instructions for:

receiving a photographing operation instruction to generate a picture;

recording a sound around the electronic device before and after receiving the photographing operation instruction;

storing the picture, the sound, and a mapping relationship between the picture and the sound;

receiving a view instruction for the picture;

displaying the picture and an audio playback button of the sound;

editing the picture and the sound, respectively, after the picture is stored, after the audio file is stored, and after the mapping relationship between the picture and the audio file is established, and while maintaining the mapping relationship between the picture and the sound; and displaying the edited picture and playing the edited sound in response to a user input.

18. The electronic apparatus according to claim 17, wherein the mapping relationship between the picture and the sound is a file name of the sound comprising a generation time of the picture.

19. The electronic apparatus according to claim 18, wherein the generation time of the picture is stored in exchangeable image file (EXIF) information of the picture.

20. The electronic apparatus according to claim 19, wherein the program further includes instructions for:
acquiring, before playing the edited sound, the edited sound according the mapping relationship between the picture and the sound.

* * * * *